Jan. 3, 1939. H. P. LUHN 2,142,401
MEASURING DEVICE
Filed Dec. 30, 1936
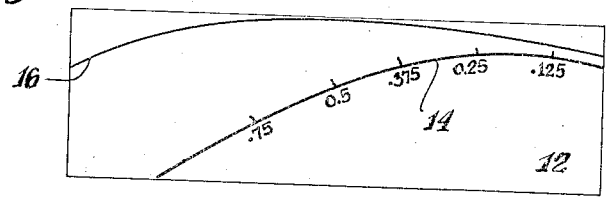
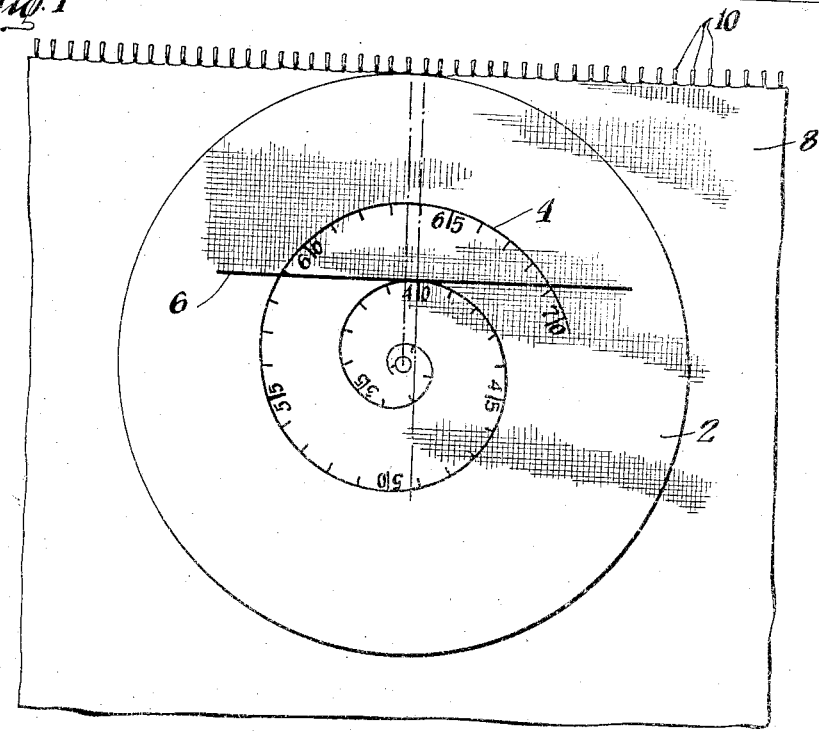
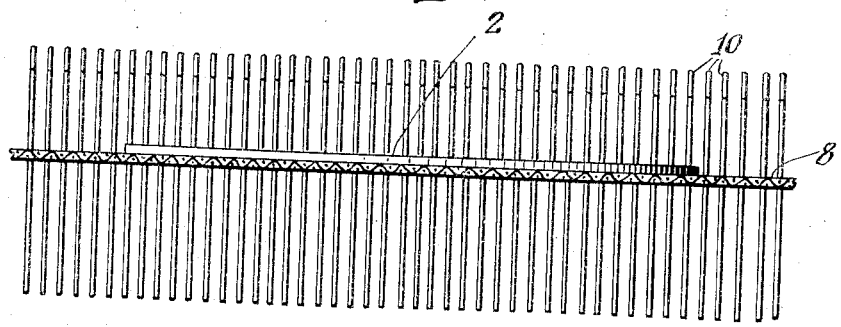
INVENTOR
Hans P. Luhn
BY
Hoguet, Neary & Campbell
ATTORNEYS Patented Jan. 3, 1939

2,142,401

UNITED STATES PATENT OFFICE 2,142,401

MEASURING DEVICE

Hans P. Luhn, North Tarrytown, N. Y.

Application December 30, 1936, Serial No. 118,223

8 Claims. (Cl. 33—1)

This invention relates to measuring devices, one embodiment thereof being particularly adapted for counting the number of courses in a knit fabric.

An object of the present invention is to provide an inexpensive critical measuring instrument including a scale on which small fractions of units are indicated by markings spaced farther apart than the width of the fractions of units to be measured.

A further object of the invention is to produce a scale which may be calibrated in any desired system of figures, for reading directly, for example, either units and/or fractions of units of measure or the number of units of similar size, in a predetermined distance.

One form of the invention may suitably consist of a transparent member having a curved edge or line thereon, and a scale curve gradually converging toward said line or edge. If desired, the curved edge or line may be the arc of a circle, and the scale curve in the form of a spiral or a section thereof spiralling outwardly about the center of curvature of the curved edge or line. The scale curve may be provided with suitable spaced apart indicia and calibrated to indicate directly the distance between parallel lines tangent to the arcuate edge or curve and a point tangent to the scale curve at the indicia marks. On this type of measuring device the scale markings may be spaced gradually decreasing distances apart from the one end of the scale to the other if such a spiral varies constantly in radius with equal length arcs of the spiral not decreasing or increasing equal amounts in radius, as in an Archimedean spiral.

In the preferred construction, the scale curve is constructed so that the indicia are spaced equal distances along the curve.

As will be understood, the scale curve and the curved edge or line on the measuring device will not have coincidental centers of curvature and consequently the points of tangency of parallel lines tangent to the curves will not be radially aligned. Therefore in laying out the curves it is necessary to fix the scale markings and indicia on the scale line at such points that a line tangent to each scale marking will be a distance from a second parallel line tangent to the other curve proportional to the indicia mark.

If desired both the scale curve and the curved edge or line may be spirals or sections of spirals so long as their spacings are of an order to indicate the distances between tangent parallel lines, or the scale curve may be the arc of a circle, and the other line or edge in the form of a spiral or a section of the same.

Measuring instruments of the type generally above described are suitable for many purposes, such as for example, the measuring of the depths of grooves in an object and the distance between parallel lines on objects, and have particular usefulness in determining the number of rows of loops or courses in a knit fabric. For the last mentioned use the scale markings and indicia are calibrated to read directly the number of courses in a predetermined length of fabric. The scale markings are laid out so that the distance between parallel lines tangent to the curves is the reciprocal of the ratio of the number of courses actually present in a unit length of fabric to a predetermined number of courses knit by the knitting machine.

For a better understanding of my invention, reference may be had to the accompanying drawing in which:

Figure 1 is a plan view of a typical embodiment of my invention as applied to a course rater in use for calculating the number of courses per inch in a knitted fabric just leaving a knitting machine;

Figure 2 is a view of an edge of the course rater as the latter is applied to a piece of fabric; and Figure 3 is a plan view of a modified form of measuring device.

As illustrated in the drawing, the course rater consists of a circular disk member 2 provided with a convolute scale 4 divided into units having indicia from 35 to 70 indicating directly the number of courses per inch in a knit fabric. The disk may be made of any suitable material, through which it is possible to see the knitted fabric when the disk is placed thereupon. Such material as Celluloid, glass, or synthetic resins may be readily utilized. If desired, the disk may be made of metal and the convolute scale 4 may be in the form of a slot through the metal.

In the type of course rater disclosed, a line tangent to the curve 4 at the indicia "50" is exactly one inch from a parallel line tangent to the edge of the disk 2. This mark is determined on the basis of a fabric containing fifty courses per inch and the device is designated as a "50" course rater. The other indicia on this scale from "30" to "70" are spaced from the periphery of the disk in accordance with the following calculations:

A knit fabric containing fifty courses averaging seventy courses per inch in width is five-sevenths of an inch wide or the reciprocal of the ratio of the number of courses in the fabric to the basic number of courses of the course rater. Accordingly, the line tangent to the portion of the curve at the point "70" is five-sevenths of an inch from a parallel line tangent to the edge of the disk. Similarly, fifty courses of knit fabric averaging thirty courses to the inch are one and two-thirds inches wide. The mark "30" is located on the curve at a point at which a line tangent to the curve is one and two-thirds inches away from a parallel line tangent to the periphery of the disk. Each of the points on the curve is determined in a like manner and therefore may be a point of tangency of a line spaced from a parallel line tangent to the periphery of the disk a distance equal to the reciprocal in inches of the ratio of the number of courses marked by the indicia to the basic number of courses of the course rater.

While the disclosed disk 2 is provided with a scale 4 calculated on a basis of fifty courses, it will be understood that this is an arbitrary figure. Course raters may be constructed with the scales thereof based on any number of courses as for example, twenty, thirty or sixty.

The convolute curve 4 may readily have any desired number of convolutions. It is preferable however to have a sufficient number that all marks or indicia on the curve will be spaced apart a sufficiently great distance that they may be readily individually visually distinguished. Such a scale thus has a very gradual decrease in radius and great length as compared with the size of the disk.

The fifty course rater above described is used in the following manner. A mark 6 is made on the fabric 8, at the needles 10 (shown diagrammatically). Fifty courses of the fabric 8 are run off the knitting machine needles 10 thereby moving the mark 6 to the position shown in Figure 1. The course rater 2 is then laid against the fabric with its periphery against the needles 10 and rotated until some portion of the scale 4 is tangent to the mark 6 on the fabric. The reading on the scale 4 at the point of tangency, for example "40", is then a direct reading of the number of courses per inch of that particular fabric, because the distance from the line 6 to the needle 10, which are tangent to periphery of the disk 2, is equal to the width of fifty courses of a fabric having an average number of forty courses to the inch.

With course raters based, for example, upon twenty, thirty or sixty courses, the number of courses run off the knitting machine will be the figure on which the rater is based. For example, a ten course rater will require ten courses to be run off the knitting machine after the mark is made.

The above described course rater is illustrative of one of the many devices which may be produced in accordance with the principles of my invention.

If desired, the scale may be calibrated to read directly in any standard unit of measure, and in this form may be utilized as a depth gauge in the manner of the ordinary ruler. For measuring the depth of, for example, grooves, the edge of the device is placed in the groove and rotated until a portion of the scale is tangent to the surface of the object containing the groove. The reading at this point is a true measure of the depth of the groove. Likewise the distance between parallel lines may be readily determined by applying the scale and reading at the tangential point.

Illustrative of another form of the invention, Figure 3 discloses a measuring device comprising a rectangular member 12 having scale curve 14 and a cooperating curved line 16 thereon which is placed in tangency with one parallel line or rocked along the line until the scale curve 14 is in tangency with a spaced parallel line. As disclosed in Figure 3, the scale curve 14 may be calibrated to read in inches and decimal fractions of the same. However, the scale may be calibrated in the metric system or as a course counter, or in any other manner desired without departing from the invention.

It will be understood from the foregoing that the typical embodiments of my invention are susceptible to many variations which will readily occur to those skilled in the various arts and therefore should not be considered as limiting the scope of the appended claims.

I claim:

1. In a measuring device, the combination of a disk member, a convolute scale on said disk member and spaced indicia marks along said scale, each indicia mark corresponding to the distance between a line tangent to the scale at said mark and a parallel line tangent to the periphery of the disk.

2. In a measuring device, the combination of a body member, a circle on said body member, a convolute scale within said circle and spaced indicia marks on said scale, each of said indicia marks corresponding to the distance between a line tangent to said scale at each corresponding indicia mark and a parallel line tangent to said circle.

3. In a device for indicating directly the number of courses in a unit of measure of knitted material, the combination of a disk member, a convolute scale on said disk member and indicia marks on said scale indicating directly the number of courses per unit length in said fabric, the distance in units of measure between parallel lines tangent to the edge of the disk and the scale at any indicia mark being the reciprocal of the ratio of the number of courses in one unit of measure of the knitted material to a predetermined number of courses of the knitted material.

4. In a device for determining the number of courses per unit of measure of a knitted fabric, a transparent body member, a curve on said body member, a scale on said member calibrated in indicia indicating directly the number of courses in said unit of measure of a knitted fabric, a tangent to said scale at each indicia mark being spaced from a line tangent to said curve a distance equal to the width of a fabric containing a predetermined number of courses, said courses being of such a width that a fabric containing a number of courses equal to said indicia mark is said unit of measure in length.

5. A device for determining the number of courses per unit inch of a knitted fabric comprising a thin body member, a curve on said body member, a scale on said body member, indicia marks on said scale indicating directly the number of courses in an inch of said fabric, the distance between a line tangent to the scale at each indicia mark and a parallel line tangent to said curve being equal to the width of a piece of fabric containing a predetermined number of courses, said courses being of such a width that a fabric containing a number of courses equal to said indicia mark is one inch wide.

6. In a measuring device, the combination of a body member, a curve on said body member, a scale curve converging toward said first curve, and indicia marks on said scale curve, each indicia mark corresponding to the distance between a line tangent to the scale at said mark and a parallel line tangent to said first curve.

7. In a measuring device, the combination of a rectangular body member, a curve on said body member, a scale curved converging toward said first curve, and indicia marks on said scale curve, each indicia mark corresponding to the distance between a line tangent to the scale at said mark and a parallel line tangent to said first curve.

8. A device for determining the number of courses per centimeter of a knitted fabric, comprising a thin body member, a curve on said body member, a scale on said body member, indicia marks on said scale indicating directly the number of courses in a centimeter of said fabric, the distance between a line tangent to the scale at each indicium mark, and a parallel line tangent to said curve being equal to the width of a piece of fabric containing a predetermined number of courses, said courses being of such a width that a fabric containing a number of courses equal to said indicium mark is one centimeter wide.

HANS P. LUHN.